(12) United States Patent
Vajravel et al.

(10) Patent No.: US 10,997,285 B2
(45) Date of Patent: May 4, 2021

(54) SELECTIVELY BLOCKING THE LOADING OF A PRIVILEGED APPLICATION

(71) Applicant: Dell Products L.P., Round Rock, TX (US)

(72) Inventors: Gokul Thiruchengode Vajravel, Bengaluru (IN); Sandeep K S, Thodupuzha (IN); Ramanujam Kaniyar Venkatesh, Bangalore (IN); Harish Agrawal, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 235 days.

(21) Appl. No.: 16/267,209

(22) Filed: Feb. 4, 2019

(65) Prior Publication Data

US 2020/0250298 A1  Aug. 6, 2020

(51) Int. Cl.
*G06F 21/51* (2013.01)
(52) U.S. Cl.
CPC ........ *G06F 21/51* (2013.01); *G06F 2221/033* (2013.01); *G06F 2221/2141* (2013.01)
(58) Field of Classification Search
CPC ............. G06F 21/51; G06F 2221/2141; G06F 2221/033
See application file for complete search history.

(56) References Cited

U.S. PATENT DOCUMENTS

| 8,950,007 B1* | 2/2015 | Teal ........................ G06F 21/57 726/30 |
| 2004/0078591 A1* | 4/2004 | Teixeira .............. H04L 63/0227 726/4 |
| 2006/0282827 A1* | 12/2006 | Yeap ........................ G06F 21/53 717/130 |
| 2015/0121543 A1* | 4/2015 | Yang ..................... H04L 63/101 726/27 |
| 2016/0371484 A1* | 12/2016 | Mehta ...................... G06F 21/54 |
| 2017/0032123 A1* | 2/2017 | Carson ..................... G06F 21/56 |
| 2020/0004966 A1* | 1/2020 | Mohinder ............... G06F 21/57 |

* cited by examiner

*Primary Examiner* — David J Pearson
(74) *Attorney, Agent, or Firm* — Kirton McConkie; Brian Tucker

(57) ABSTRACT

The loading of a privileged application can be selectively blocked. An application restrictor can be configured to register for notifications whenever an application image is loaded. Then, whenever the application restrictor receives a notification, the application restrictor can evaluate whether the application image that is being loaded is a privileged application. If so, the application restrictor can evaluate the current process's parent tree to determine if an untrusted application is present at any level of the parent tree. The application restrictor will then allow the privileged application to load only when all applications in the parent tree are trusted applications. In this way, untrusted applications can be blocked from accessing a privileged application without blocking trusted applications from accessing the privileged application.

20 Claims, 14 Drawing Sheets

SELECTIVELY BLOCKING THE LOADING OF A PRIVILEGED APPLICATION

CROSS-REFERENCE TO RELATED APPLICATIONS

N/A

BACKGROUND

Anti-malware applications are commonly installed on computing devices to block the execution of malware. Such anti-malware applications primarily function by analyzing executables to determine whether they include any known malware signatures. The problem with this approach is that, if the signature of a particular malware is still unknown, the anti-malware applications likely will not detect it. These vulnerabilities are commonly referred to as zero-day vulnerabilities where "zero-day" refers to the fact that the software vendor has not yet provided a patch to fix the vulnerability and anti-malware providers have not yet developed a way to detect malware intended to exploit the vulnerability.

To protect against zero-day vulnerabilities, it is common in some environments to block the execution of all but a limited set of trusted applications. This is particularly true of controlled environments such as Kiosks, ATM machines and the like. As an example, a Kiosk that provides information in a public location can be configured so that only the applications necessary to provide the user interface are trusted and therefore allowed to execute while all other applications are blocked. In a Windows environment, this can be accomplished using suitable group policies in Active Directory to block all applications that are not identified as trusted.

This all or nothing blocking technique of current solutions creates various problems. For example, if a trusted application desires to print using Adobe Reader, and Adobe Reader is not listed as a trusted application, the trusted application would be prevented from printing. Similarly, if a trusted application desired to use regedit to change a setting, but regedit is not listed as a trusted application, the trusted application will be prevented from changing the setting. There currently is no way to selectively allow a trusted application to load and access a blocked application. Using the same two examples, the only way to allow the trusted application to print via Adobe Reader or to change a setting using regedit is to make Adobe Reader and regedit trusted applications. However, doing so would increase the system's vulnerability.

BRIEF SUMMARY

The present invention extends to methods, systems, and computer program products for selectively blocking the loading of a privileged application. An application restrictor can be configured to register for notifications whenever an application image is loaded. Then, whenever the application restrictor receives a notification, the application restrictor can evaluate whether the application image that is being loaded is a privileged application. If so, the application restrictor can evaluate the current process's parent tree to determine if an untrusted application is present at any level of the parent tree. The application restrictor will then allow the privileged application to load only when all applications in the parent tree are trusted applications. In this way, untrusted applications can be blocked from accessing a privileged application without blocking trusted applications from accessing the privileged application.

In one embodiment, the present invention is implemented by an application restrictor as a method for selectively blocking the loading of a privileged application. The application restrictor maintains a list of privileged applications and a list of trusted applications. The application restrictor then receives a notification that an application image is being loaded. In response, the application restrictor accesses the list of privileged applications to determine whether the application image is a privileged application. Upon determining that the application image is a privileged application, the application restrictor traverses a parent tree of a process in which the application image is being loaded. The application restrictor also accesses the list of trusted applications to determine whether any application in the parent tree is not a trusted application. Upon determining that an application in the parent tree is not a trusted application, the application restrictor blocks the loading of the application image.

In another embodiment, the present invention is implemented as computer storage media that stores computer executable instructions which when executed implement an application restrictor that is configured to perform the following steps to selectively block the loading of a privileged application: registering to receive notifications when an application image is loaded for execution; receiving a list of privileged applications and a list of trusted applications; receiving a particular notification that an application image is being loaded; accessing the list of privileged applications to determine whether the application mage is a privileged application; upon determining that the application image is a privileged application, accessing the list of trusted applications to determine whether any application in a parent tree is not a trusted application; and upon determining that an application in the parent tree is not a trusted application, blocking the loading of the application image.

In another embodiment, the present invention is implemented by an application restrictor as a method for selectively blocking the loading of a privileged application. The application restrictor receives a notification that an application image is being loaded into a process for execution. The application restrictor obtains a name of the application image and compares the name of the application image to a list of privileged applications to determine whether the application image is a privileged application. Upon determining that the application image is a privileged application, the application restrictor identifies a name of a second application image that is loaded into a parent process and compares the name of the second application image to a list of trusted applications to determine whether the second application is a trusted application. Upon determining that the second application is not a trusted application, the application restrictor blocks the loading of the application image.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention employs two categories of applications: trusted applications and privileged applications. Privileged applications are applications that will only be allowed to execute when they are invoked by a trusted application. Typically, a privileged application will be an application that provides the ability to modify system settings or otherwise perform privileged actions. For example, regedit.exe and powershell.exe may be identified as privileged applications in a Windows environment. However, a privileged application may also be an application that a trusted application periodically invokes to perform some limited function (e.g., printing a PDF via Adobe Reader). Which applications are identified as trusted applications will vary based on the intended use of the computing device. For example, if the computing device is a Kiosk, the trusted applications may be limited to those that are necessary to provide a user interface.

The term "managed device" will be used to refer to a computing device on which a device agent is installed to allow the computing device to be managed from a management solution. A managed device may oftentimes be in the form of a thin client but could also be a standard desktop computer, mobile device or any other type of end user computing device. The present invention may be particularly beneficial in environments where the managed device is an unattended Kiosk. The techniques of the present invention, however, should not be limited to implementation on managed devices.

Figure 1:
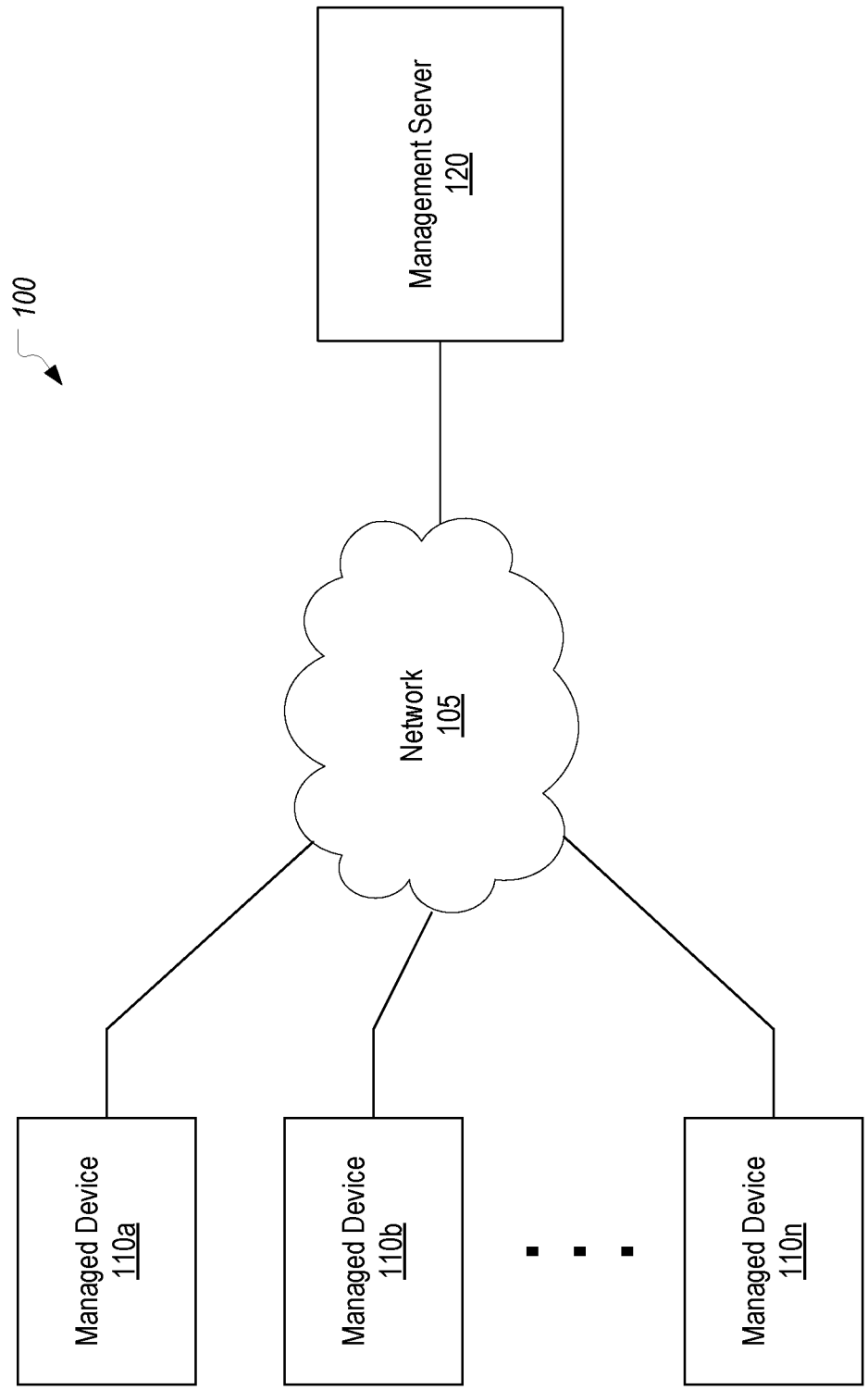
FIG. 1 illustrates an example computing environment in which the present invention can be implemented.

FIG. 1 provides an example of an environment 100 in which the present invention can be implemented. Environment 100 includes a management server 120 and a number of managed devices 110a-110n that are interconnected by a network 105. Management server 120 can represent any type of server architecture, including any number of physical or virtual machines, on which a management solution is implemented. As one example only, management server 120 can represent Dell's Wyse Management Suite. As mentioned above, managed devices 110a-110n (or generally managed device 110) can represent any type of end user computing device on which a device agent is installed which allows the device to be managed from management server 120. Network 105 can represent any type and/or number of networks including the internet.

Figure 2:
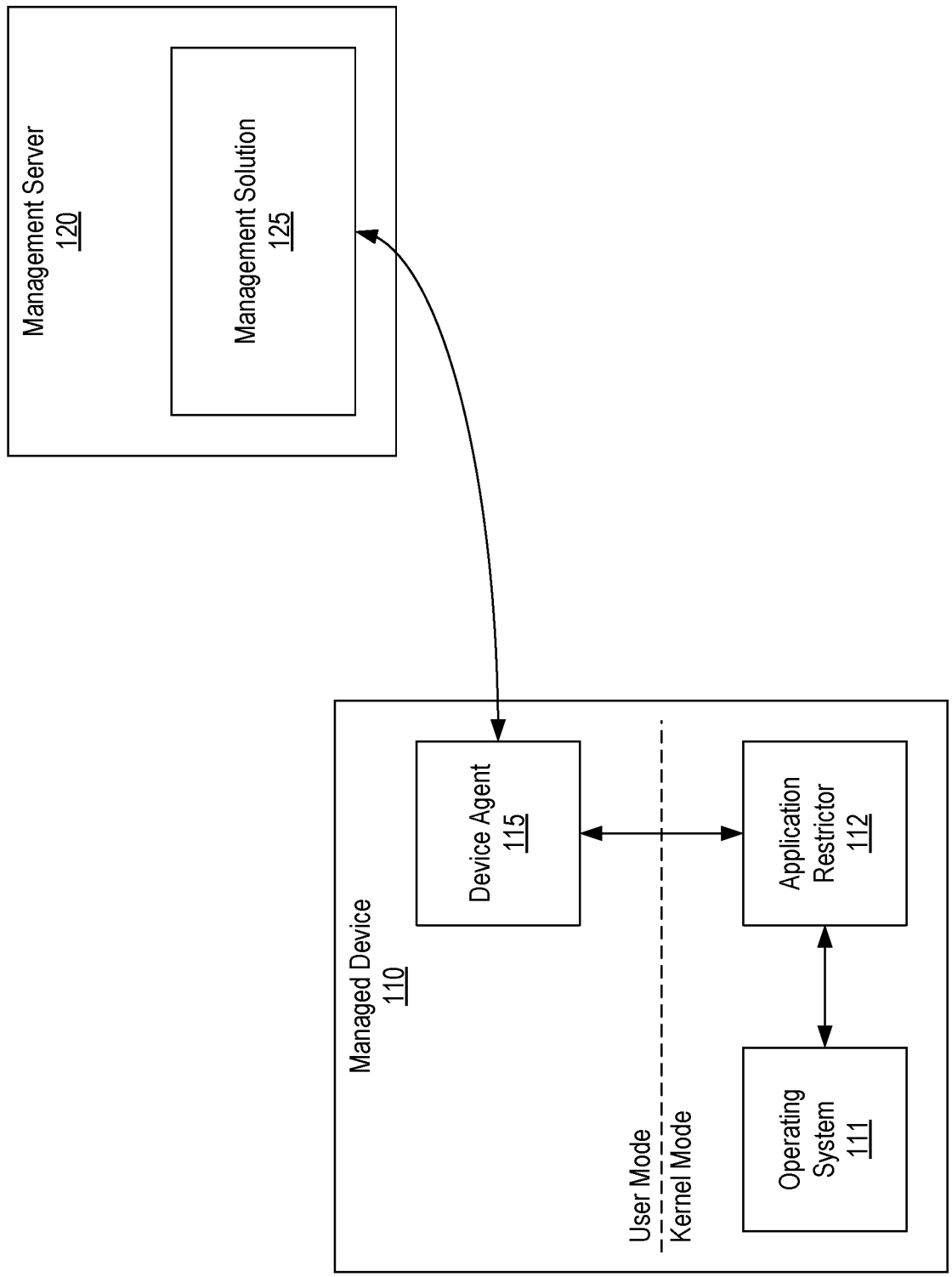
FIG. 2 illustrates example components that can be installed on an end user computing device and a management server in some embodiments of the present invention.

FIG. 2 provides an example of various components that can exist on managed device 110 and management server 120 as well as how these components can intercommunicate. As shown, management server 120 includes a management solution 125 that enables an administrator to manage each managed device 110. To accomplish this management, each managed device 110 includes a device agent 115 that communicates with management solution 125. For example, management solution 125 can send commands to device agent 115 to cause device agent 115 to modify the configuration of managed device 110 in a desired manner.

Each managed device 110 also includes an operating system 111. Of primary relevance to the present invention, operating system 111 includes an image loader that is tasked with loading application images for execution. In this context, loading generally encompasses mapping the image into a process's virtual memory. In accordance with embodiments of the present invention, each managed device 110 also includes an application restrictor 112. As shown, application restrictor 112 may be a kernel mode component that is configured to communicate with device agent 115 to enable application restrictor 112 to implement the selective blocking techniques of the present invention. Applicant restrictor 112 is also configured to interface with operating system 111 as will be described below.

FIGS. 3A-3E and 4A-4D illustrate how application restrictor 112 can be configured to selectively block the loading of a privileged application. Preferably, application restrictor 112 can be registered with operating system 111 so that it is loaded when the operating system is loaded. As part of its initialization, and as represented as step 1a in FIG. 3A, application restrictor 112 can register with operating system 111 to be notified whenever an application image is loaded. When operating system 111 is a version of Windows, this can be accomplished by calling the PsSetLoadImageNotifyRoutine function to register a callback function that operating system 111 will call each time an application image (e.g., a .exe or .dll) is loaded. For purposes of this example, it will be assumed that the callback function that application restrictor 112 registers is named "NotifyRoutine."

Additionally, in step 1b, application restrictor 112 retrieves lists 200 from device agent 115. As shown, lists 200 identify privileged applications and trusted applications. Lists 200 may be created or updated by an administrator using management solution 125 and then sent to device agent 115. Although application restrictor 112 is shown as retrieving lists 200 as part of its initialization process, it may equally retrieve/receive lists 200 or updates to lists 200 at any time.

Figure 3A:
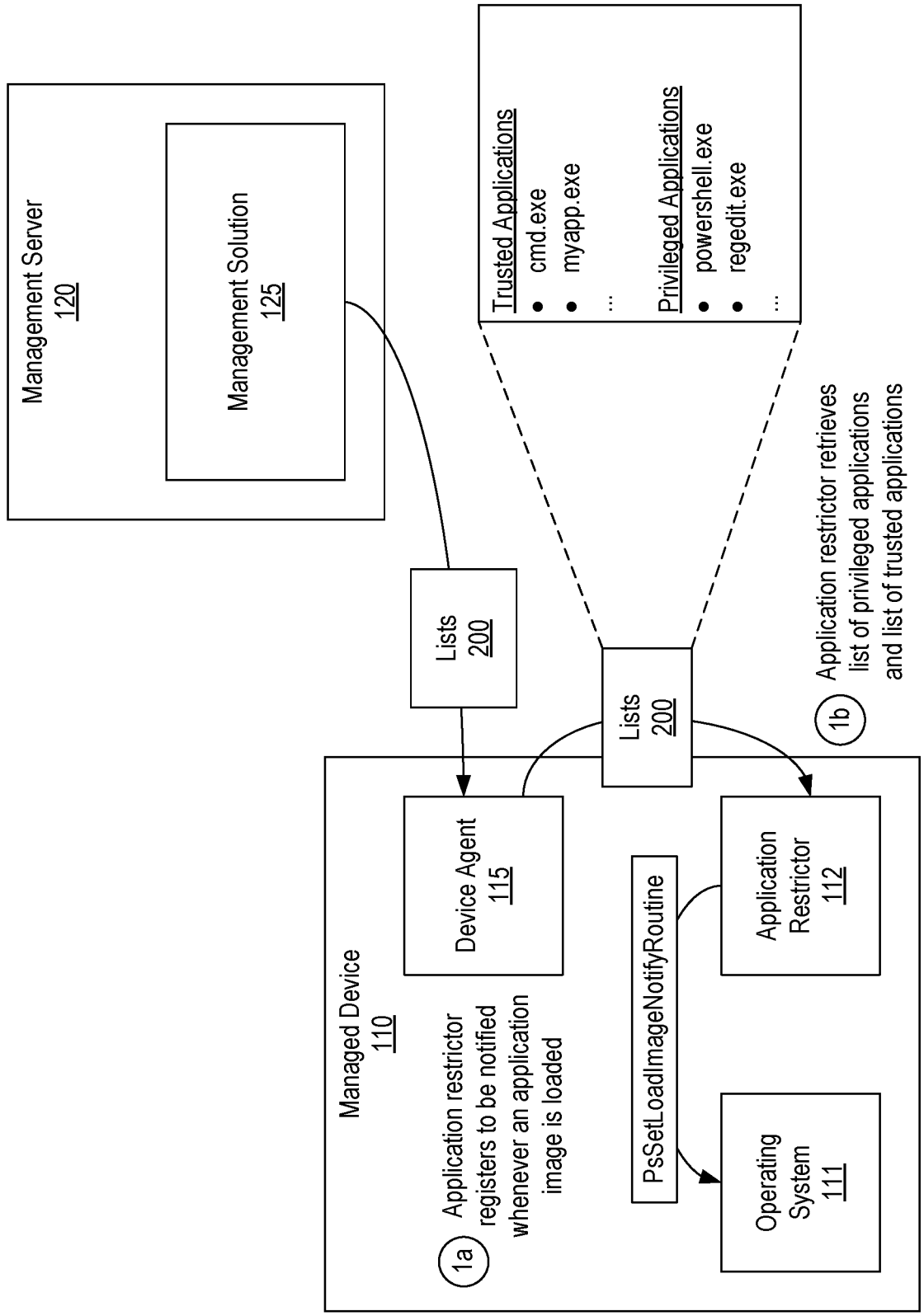
FIGS. 3A-3E and 4A-4D illustrate a sequence of steps that can be performed by an application restrictor to selectively block the loading of a privileged application.
Figure 3B:
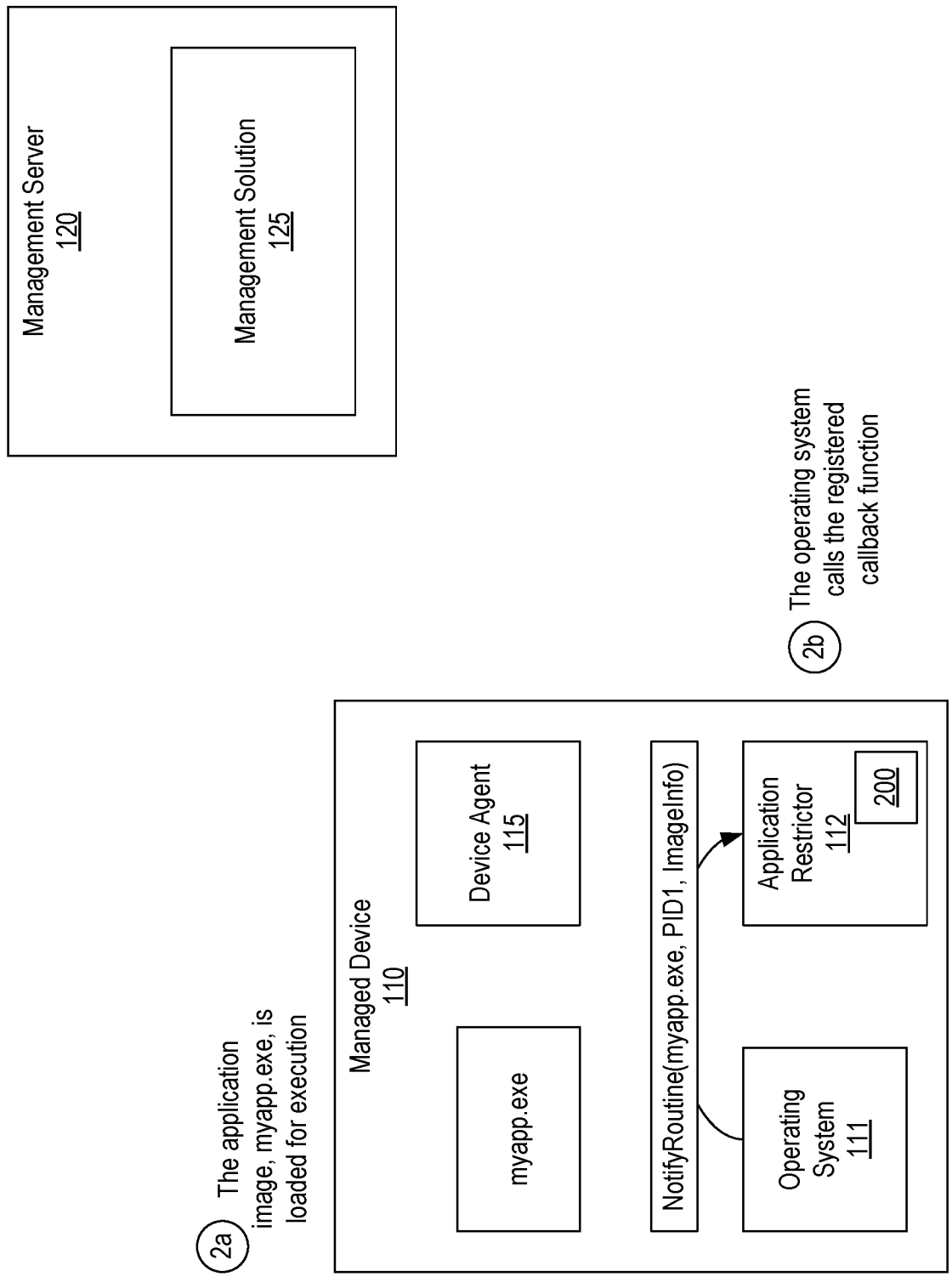

Turning to FIG. 3B, it is assumed that the application, myapp.exe, is loaded in step 2a. For example, myapp.exe may be configured to load at startup, may have been invoked by device agent 115 or may have been invoked by the end user. Regardless of how myapp.exe was invoked, operating system 111 will load the application image into virtual memory associated with a process. In step 2b, and as a result of application restrictor 112 having registered a callback function to be called when application images are loaded, operating system 111 calls NotifyFunction and passes as input the name of the application image (myapp.exe), a handle to the process Id (PID1) of the process in which the application image has been loaded (or mapped), and a pointer (ImageInfo) to an IMAGE_INFO structure that contains information about the loaded application image.

Figure 3C:
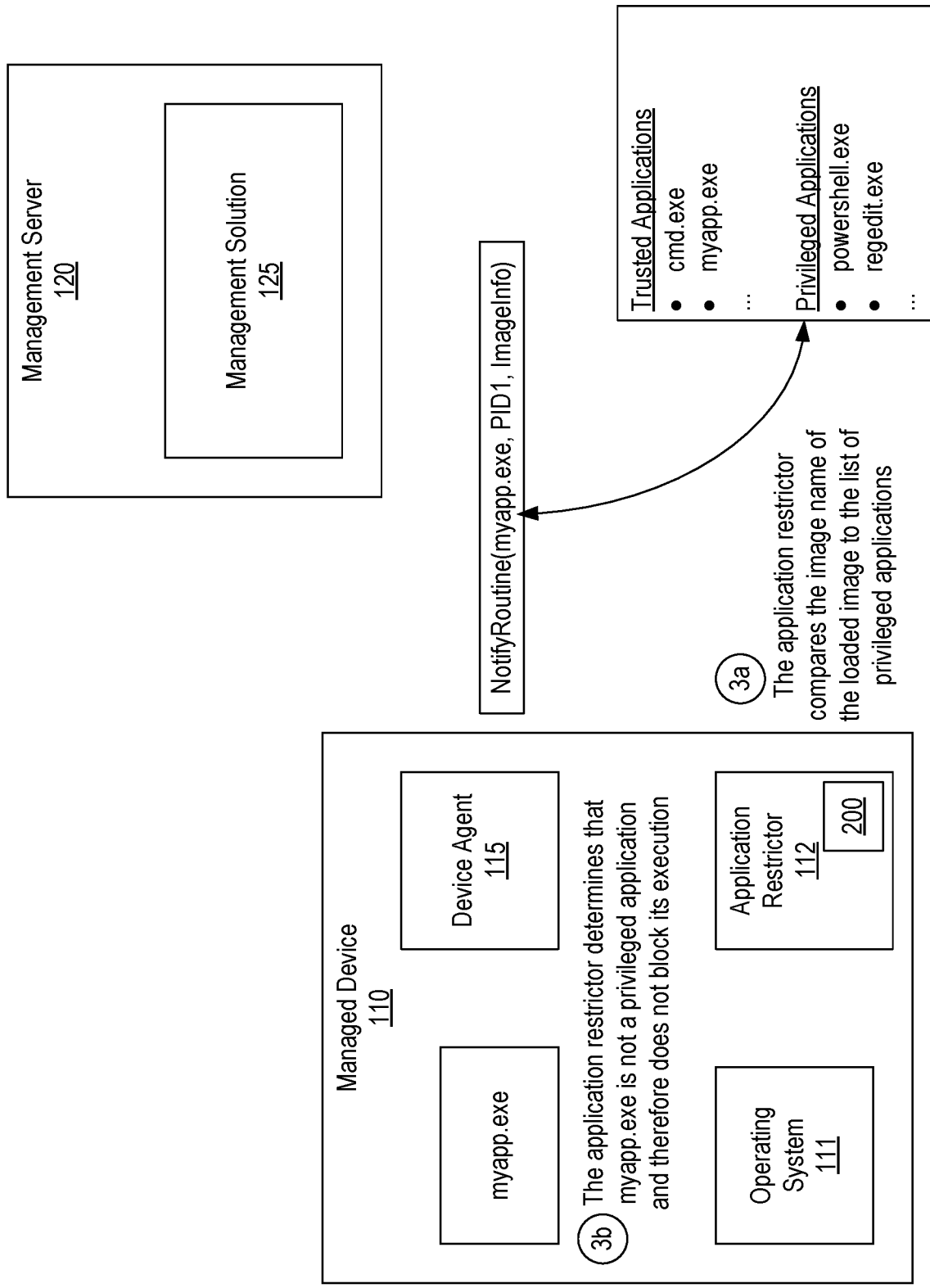

As shown as step 3a in FIG. 3C, as part of its NotifyRoutine callback function, application restrictor 112 can obtain the name of the application image that has been loaded (myapp.exe) and can access lists 200 to determine whether the loaded application image is a privileged application. In this example, it is assumed that myapp.exe is not identified as a privileged application in lists 200. Accordingly, in step 3b, application restrictor 112 takes no action thereby allowing myapp.exe to be executed.

Figure 3D:
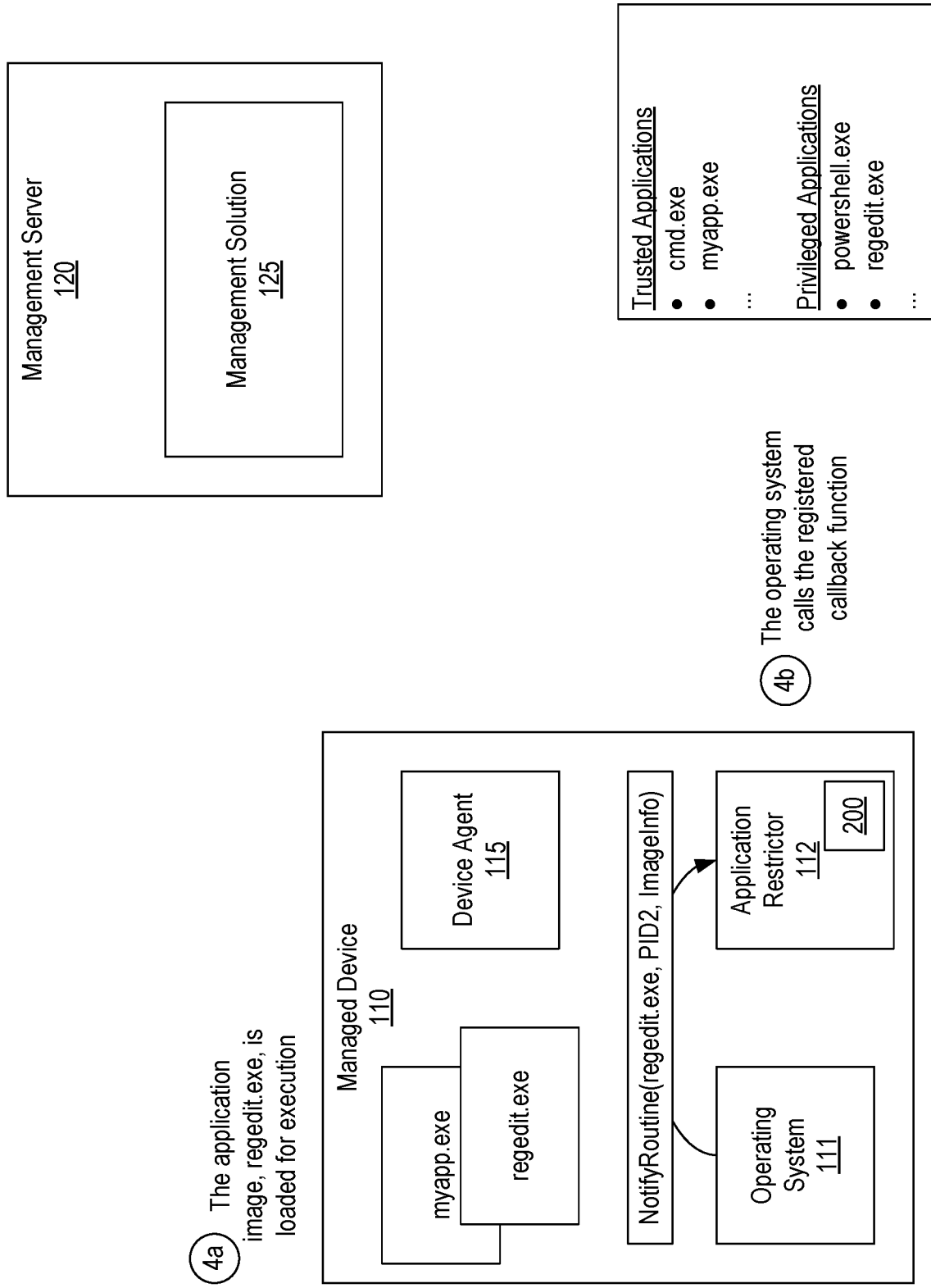

Next, in step 4*a* shown in FIG. 3D, it is assumed that myapp.exe invokes regedit.exe causing operating system 111 to commence loading the regedit image. In step 4*b*, operating system 111 will call the NotifyRoutine callback function with inputs of regedit.exe (the name of the loaded image), PID2 (which is assumed to be the process Id of the process in which the regedit image has been loaded), and a pointer to the corresponding ImageInfo structure.

Figure 3E:
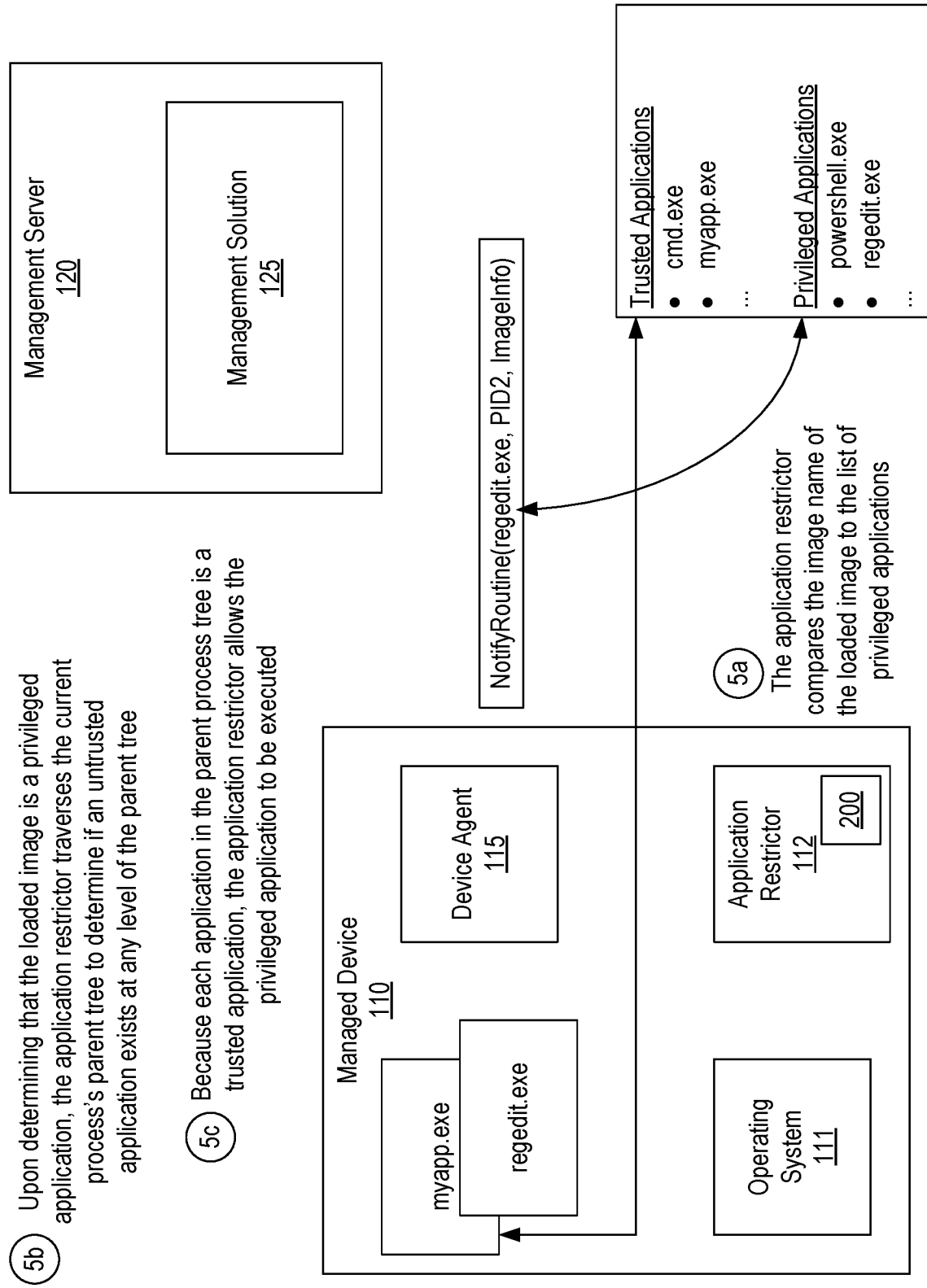

In step 5*a* shown in FIG. 3E, application restrictor 112 can obtain the name of the application image that has been loaded (regedit.exe) and can access lists 200 to determine whether the loaded application image is a privileged application. In this case, lists 200 identifies regedit.exe as a privileged application. Therefore, in step 5*b*, application restrictor 112 can traverse the current process's parent tree to determine whether an untrusted application exists at any level of the parent tree. For example, application restrictor 112 can obtain the process Id from the call to the NotifyRoutine callback function (which identifies the process in which regedit has been loaded), and can use this process Id to obtain the parent process Id (e.g., by calling the ZwQueryInformationProcess function to retrieve the ProcessBasicInformation which includes an InheritedFromUniqueProcessId member that defines the parent process's process Id). The parent process Id can then be used to obtain the name of the application image for the parent process and this name can be compared against lists 200 to determine whether it is a trusted application.

In the current example, because myapp.exe invoked regedit.exe, application restrictor 112 will discover that the current process's parent process has a process Id of PID1. Application restrictor 112 would then use PID1 to obtain the corresponding name of the application image which would be myapp.exe. Application restrictor 112 would then access lists 200 to determine whether myapp.exe is a trusted application.

This process of obtaining the parent process Id and using it to obtain the image name can be repeated at each level of the parent tree. For example, although not shown in FIG. 3E, it will be assumed that myapp.exe was invoked by explorer.exe. Accordingly, application restrictor 112 would employ PID1 to obtain the process Id of the grandparent process and use it to obtain the name of the application image (which would be explorer.exe) and compare it to the list of trusted applications. In some embodiments, application restrictor 112 can traverse the parent tree until no further parent process is found or may traverse the parent tree until the parent process is a known system process (e.g., explorer.exe or services.exe). Finally, in step 5*c*, and assuming each application in the parent process tree is identified in lists 200 as a trusted application, application restrictor 112 will allow the privileged application, regedit.exe, to be executed.

Figure 4A:
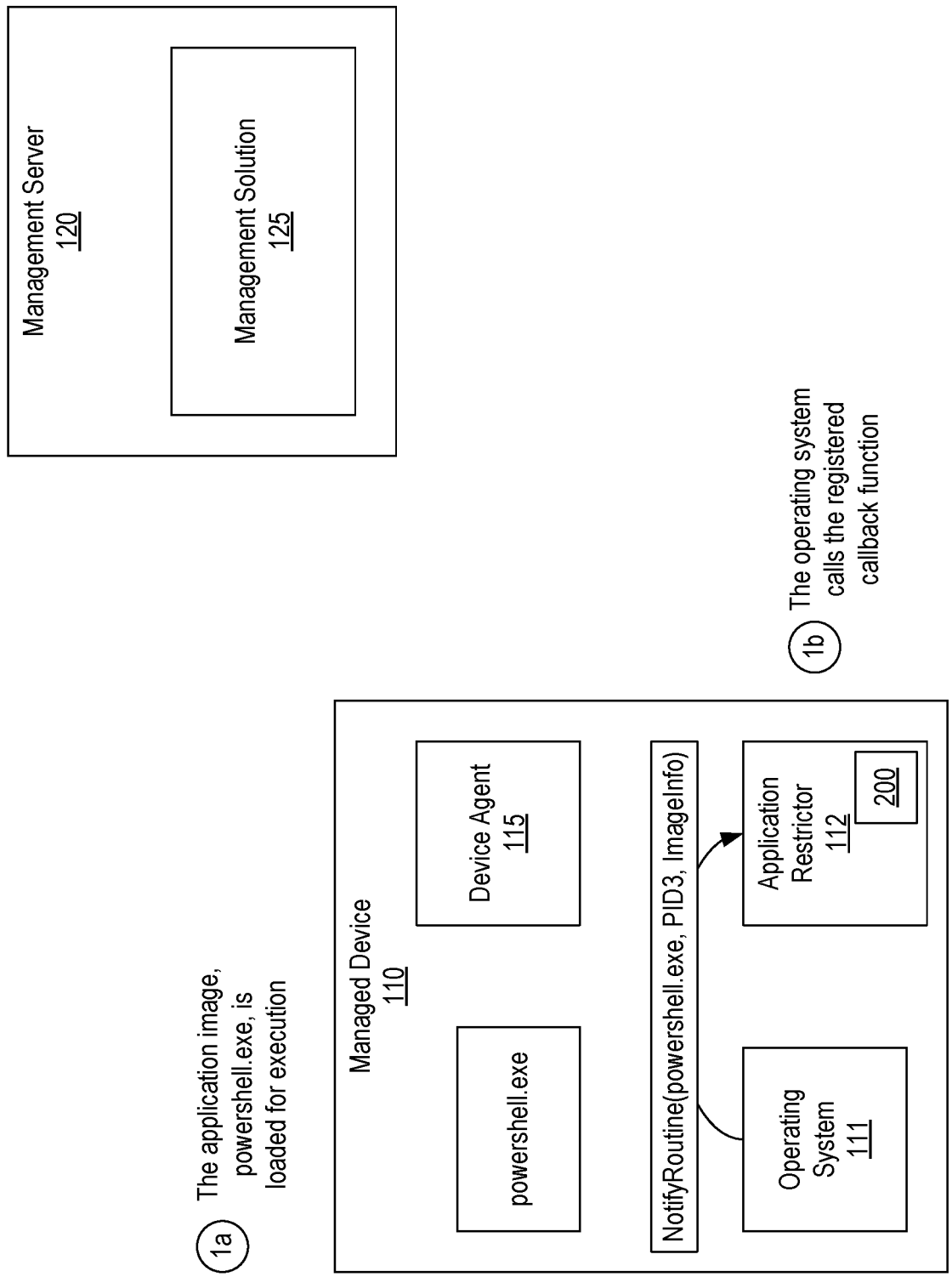
Figure 4B:
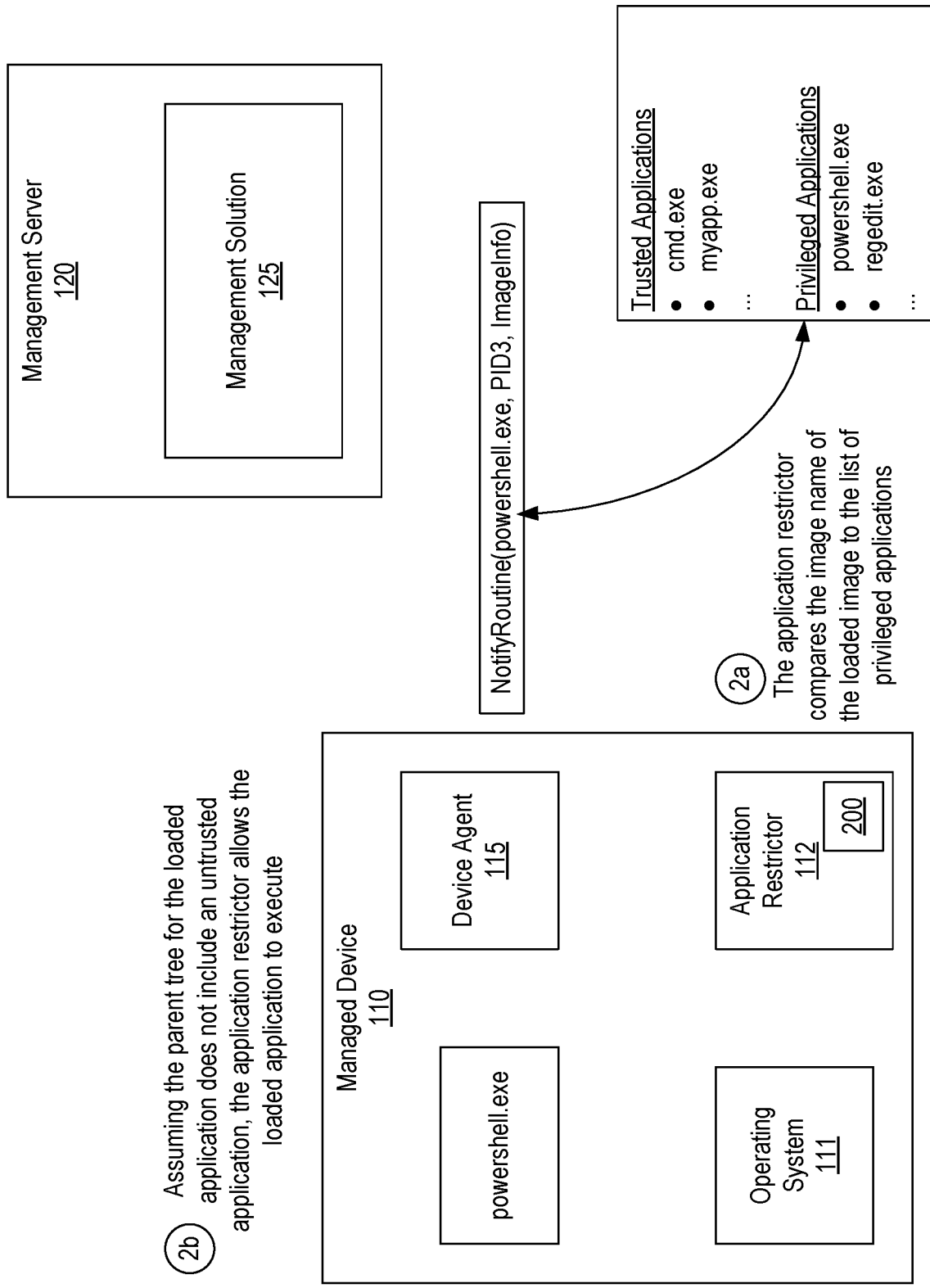

FIGS. 4A-4D illustrate this same sequence of functionality in the case where an untrusted application exists in the parent process tree. In FIG. 4A, it is assumed that powershell.exe has been invoked from explorer.exe. As a result, in step 1*a*, the powershell.exe image will be loaded and, in step 1*b*, operating system 111 will notify application restrictor 112. In step 2*a* shown in FIG. 4B, application restrictor 112 will determine that powershell.exe is a privileged application. However, in step 2*b*, application restrictor 112 will traverse the parent process tree and discover that no untrusted applications exist at any level (assuming explorer.exe is a trusted application). Accordingly, application restrictor 112 will allow powershell.exe to execute.

Figure 4C:
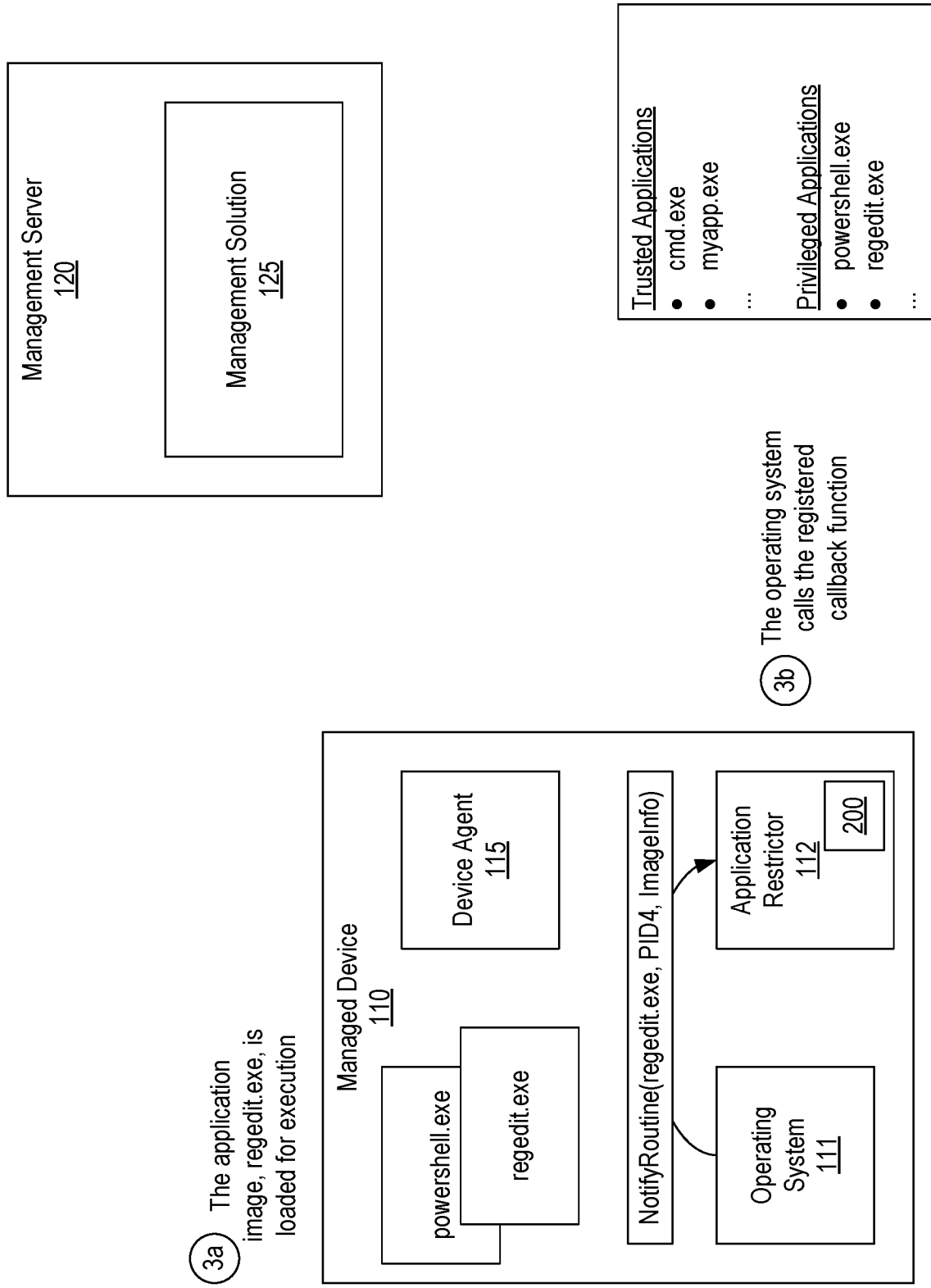

Next, in step 3*a* shown in FIG. 4C, it is assumed that regedit.exe is invoked from within powershell.exe causing the regedit.exe image to be loaded. As a result, operating system 111 will call application restrictor 112's callback function in step 3*b* and provide the name of the loaded image (regedit.exe) and the process Id (PID4).

Figure 4D:
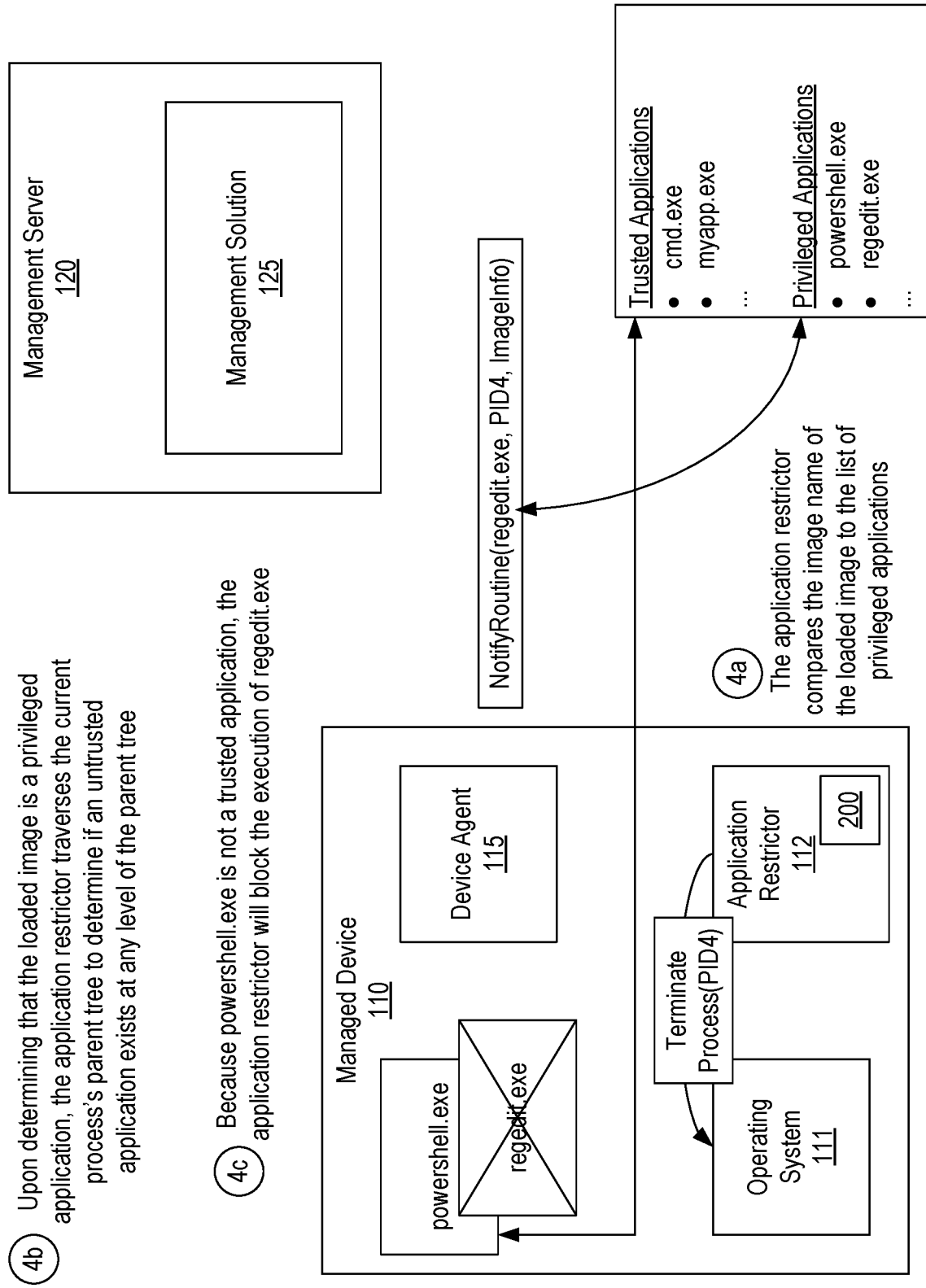

In step 4*a* shown in FIG. 4D, application restrictor 112 will determine that regedit.exe is a privileged application and will therefore traverse the parent process tree in step 4*b*. As part of this traversal, application restrictor 112 will discover that powershell.exe is in the parent process tree and is not a trusted application. Accordingly, in step 4*c*, application restrictor 112 will block the loading and execution of regedit.exe in the current process. For example, application restrictor 112 can call ZwTerminateProcess and specify the process Id for the current process (PID4) and an NTSTATUS value of STATUS_ACCESS_DENIED.

As can be seen in these examples, privileged applications are not completely blocked but are allowed to execute only when there are no untrusted applications at any level of the parent process tree. This selective blocking of the loading of privileged applications will therefore enable a managed device to be more easily configured when necessary while still minimizing the managed device's vulnerability to zero-day threats.

The examples given above are based on a Windows implementation of the present invention. The present invention may be implemented in similar manner in Linux environments. For example, when application restrictor 112 is configured for execution in a Linux environment, it can register to be notified of the loading of an application by creating a Netlink connector socket (e.g., by calling socket (PF_NETLINK, SOCK_DGRAM, NETLINK_CONNECTOR)) and subscribing to receive process events (e.g., by specifying PROC_CN_MCAST_LISTEN). Then, application restrictor 112 can process each event it receives from the Netlink connector socket to monitor for PROC_EVENT_FORK events. Such events will provide the process Id for the child application (the forked process) and the parent application (the forking process) which application restrictor 112 can employ in the manner described above to determine whether the forked process is a privileged application, and if so, whether any untrusted applications exist in the parent process tree.

Figure 5A:
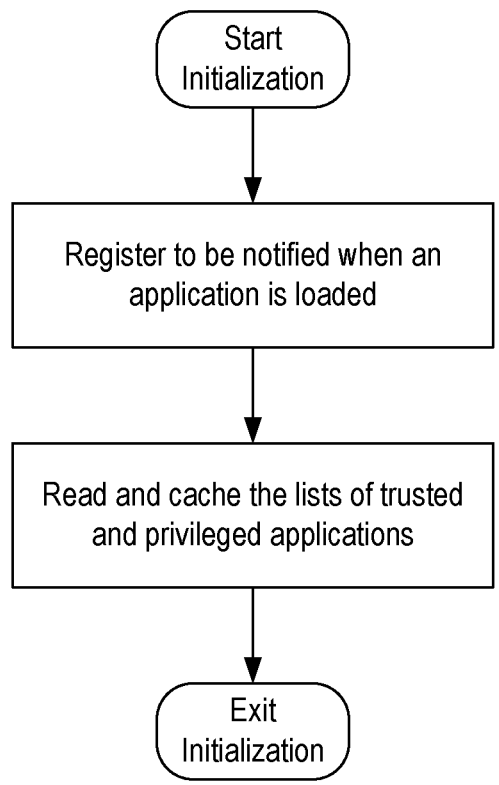
FIGS. 5A and 5B illustrate flow diagrams representing the functionality the application restrictor can perform.
Figure 5B:
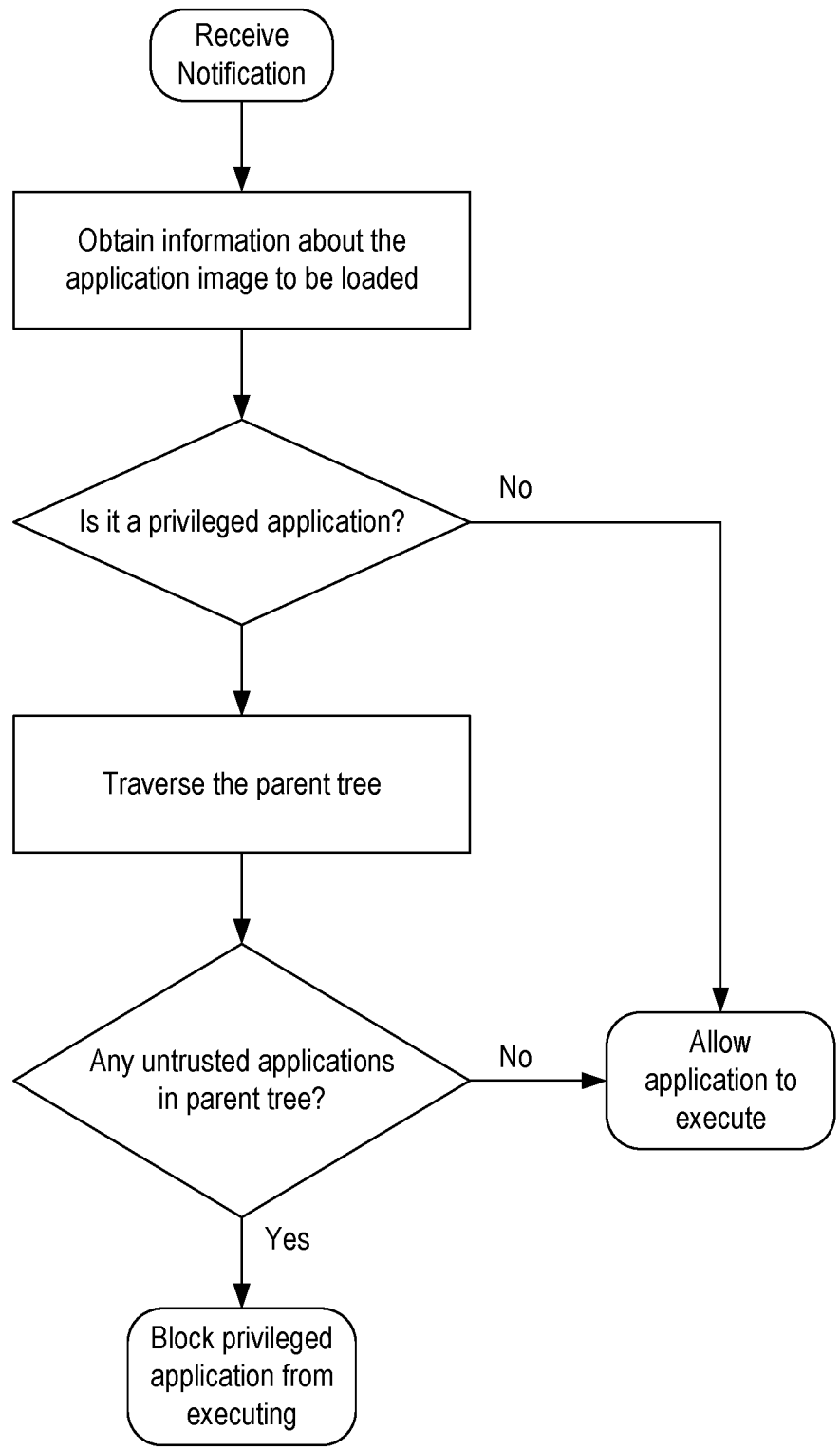

FIGS. 5A and 5B provide flow diagrams that summarize the above-described process that application restrictor 112 performs. The flow diagram in FIG. 5A represents the processing that application restrictor 112 can perform during initialization including registering to be notified when an application is loaded (e.g., by calling PsSetLoadImageNotifyRoutine in Windows or by establishing a Netlink connector socket to listen for process events in Linux) and reading and caching the lists 200 of trusted and privileged applications.

The flow diagram in FIG. 5B represents the processing that application restrictor 112 can perform upon receiving a notification that an application image is being loaded (e.g., when application restrictor 112's callback function is invoked in Windows or when application restrictor 112 receives a PROC_EVENT_FORK event from the Netlink connector socket in Linux). This processing includes determining whether the application image being loaded (or mapped/forked) is a privileged application, when the application image is a privileged application, traversing the parent tree, and then determining whether any untrusted application is present in the parent tree. Application restrictor 112 will allow the application image to load and execute only when it is not a privileged application or when no untrusted application exists in the parent tree.

Figure 6:
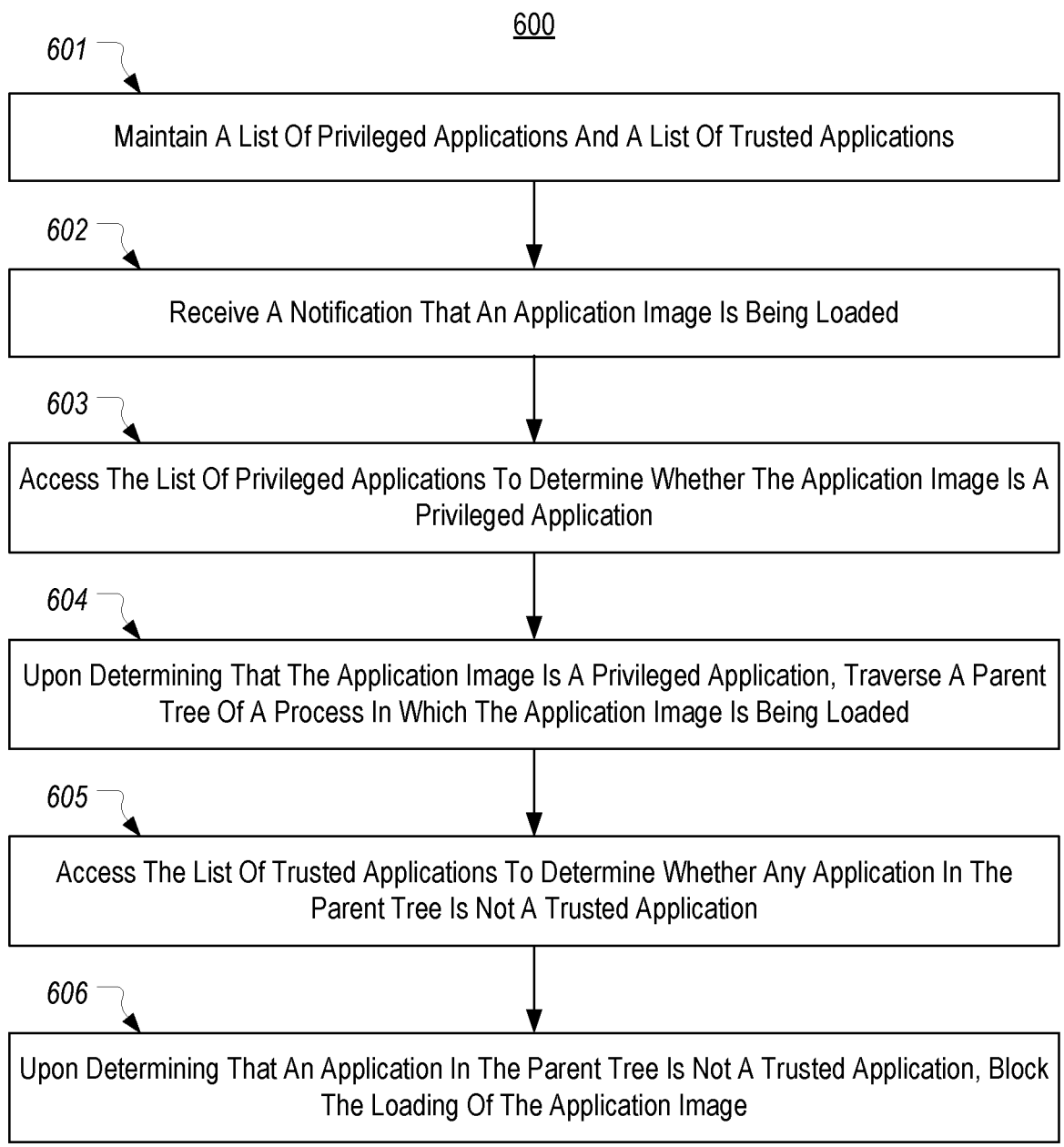
FIG. 6 provides a flowchart of an example method for selectively blocking the loading of a privileged application.

FIG. 6 provides a flowchart of an example method 600 for selectively blocking the loading of a privileged application. Method 600 can be implemented by application restrictor 112 in both Windows and Linux environments.

Method 600 includes an act 601 of maintaining a list of privileged applications and a list of trusted applications. For example, application restrictor 112 can obtain lists 200 from device agent 115 and/or management solution 125.

Method 600 includes an act 602 of receiving a notification that an application image is being loaded. For example, application restrictor 112's callback function can be invoked by operating system 111 or application restrictor 112 can receive a process event from operating system 111.

Method 600 includes an act 603 of accessing the list of privileged applications to determine whether the application image is a privileged application. For example, application restrictor 112 can access lists 200 to determine whether the list of privileged applications includes a name of the application image that is being loaded.

Method 600 includes an act 604 of, upon determining that the application image is a privileged application, traversing a parent tree of a process in which the application image is being loaded. For example, application restrictor 112 can evaluate a parent process and possibly additional parent processes in the parent tree.

Method 600 includes an act 605 of accessing the list of trusted applications to determine whether any application in the parent tree is not a trusted application. For example, application restrictor 112 can compare a name of an application image loaded in each parent process in the parent tree to the list of trusted applications.

Method 600 includes an act 606 of, upon determining that an application in the parent tree is not a trusted application, blocking the loading of the application image. For example, application restrictor 112 can instruct operating system 111 to prevent the application image from executing such as by terminating the process in which the application image is being loaded.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an application restrictor that executes on a computing device, for selectively blocking the loading of a privileged application, the method comprising:
   maintaining a list of privileged applications and a list of trusted applications;
   receiving a notification that an application image is being loaded;
   accessing the list of privileged applications to determine whether the application image is a privileged application;
   upon determining that the application image is a privileged application, traversing a parent tree of a process in which the application image is being loaded;
   accessing the list of trusted applications to determine whether any application in the parent tree is not a trusted application; and
   upon determining that an application in the parent tree is not a trusted application, blocking the loading of the application image.

2. The method of claim 1, wherein the list of privileged applications and the list of trusted applications are received from a device agent that executes on the computing device.

3. The method of claim 1, wherein the notification is received from an operating system on the computing device via a callback function that the application restrictor previously registered with the operating system.

4. The method of claim 3, wherein the notification includes a name of the application image.

5. The method of claim 4, wherein accessing the list of privileged applications to determine whether the application image is a privileged application comprises determining whether the list of privileged applications includes the name of the application image that is included in the notification.

6. The method of claim 1, wherein the parent tree includes a parent process and wherein traversing the parent tree includes identifying a name of an application image that is loaded into the parent process.

7. The method of claim 6, wherein accessing the list of trusted applications to determine whether any application in the parent tree is not a trusted application comprises determining whether the list of trusted applications includes the name of the application image that is loaded into the parent process.

8. The method of claim 6, wherein the parent tree also includes a grandparent process and wherein traversing the parent tree includes identifying a name of an application image that is loaded into the grandparent process, and wherein accessing the list of trusted applications to determine whether any application in the parent tree is not a trusted application comprises determining whether the list of trusted applications includes the name of the application image that is loaded into the grandparent process.

9. The method of claim 1, wherein the notification is received from an operating system on the computing device via a socket.

10. The method of claim 9, wherein the notification that an application image is being loaded comprises a notification of a forked process.

11. The method of claim 1, further comprising:
receiving a second notification that a second application image is being loaded;
accessing the list of privileged applications to determine whether the second application image is a privileged application;
upon determining that the second application image is not a privileged application, allowing the second application image to be executed.

12. The method of claim 1, further comprising:
receiving a second notification that a second application image is being loaded;
accessing the list of privileged applications to determine whether the second application image is a privileged application;
upon determining that the second application image is a privileged application, traversing a second parent tree of a process in which the second application image is being loaded;
accessing the list of trusted applications to determine whether any application in the second parent tree is not a trusted application; and
upon determining that each application in the second parent tree is a trusted application, allowing the second application image to be executed.

13. The method of claim 1, wherein blocking the loading of the application image comprises terminating the process in which the application image is being loaded.

14. One or more computer storage media storing computer executable instructions which when executed implement an application restrictor that is configured to perform the following steps to selectively block the loading of a privileged application, the steps including:
registering to receive notifications when an application image is loaded for execution;
receiving a list of privileged applications and a list of trusted applications;
receiving a particular notification that an application image is being loaded;
accessing the list of privileged applications to determine whether the application image is a privileged application;
upon determining that the application image is a privileged application, accessing the list of trusted applications to determine whether any application in a parent tree is not a trusted application; and
upon determining that an application in the parent tree is not a trusted application, blocking the loading of the application image.

15. The computer storage media of claim 14, wherein determining whether any application in a parent tree is not a trusted application comprises obtaining a name of an application image that is loaded in each process in the parent tree and comparing each name to the list of trusted applications.

16. The computer storage media of claim 14, wherein the application restrictor is further configured to perform the following steps:
upon determining that each application in the parent tree is a trusted application, allowing the application image to be executed.

17. The computer storage media of claim 14, wherein registering to receive notifications when an application image is loaded for execution comprises one of:
providing a callback function to an operating system to be called whenever an application image is loaded; or
subscribing to receive process events from the operating system.

18. The computer storage media of claim 14, wherein blocking the loading of the application image comprises terminating a process into which the application image is loaded.

19. A method, performed by an application restrictor that executes on a computing device, for selectively blocking the loading of a privileged application, the method comprising:
receiving a notification that an application image is being loaded into a process for execution;
obtaining a name of the application image;
comparing the name of the application image to a list of privileged applications to determine whether the application image is a privileged application;
upon determining that the application image is a privileged application, identifying a name of a second application image that is loaded into a parent process;
comparing the name of the second application image to a list of trusted applications to determine whether the second application is a trusted application; and
upon determining that the second application is not a trusted application, blocking the loading of the application image.

20. The method of claim 19, wherein blocking the loading of the application image comprises terminating the process into which the application image is being loaded.

* * * * *